US012361100B1

(12) United States Patent
Petry, III et al.

(10) Patent No.: US 12,361,100 B1
(45) Date of Patent: Jul. 15, 2025

(54) SYSTEM AND METHOD FOR APPLYING DEEP LEARNING TOOLS TO MACHINE VISION AND INTERFACE FOR THE SAME

(71) Applicant: Cognex Corporation, Natick, MA (US)

(72) Inventors: John P. Petry, III, Newton, MA (US); Reto Wyss, Lexington, MA (US)

(73) Assignee: Cognex Corporation, Natick, MA (US)

( * ) Notice: Subject to any disclaimer, the term of this patent is extended or adjusted under 35 U.S.C. 154(b) by 895 days.

(21) Appl. No.: 17/117,105

(22) Filed: Dec. 9, 2020

Related U.S. Application Data

(60) Provisional application No. 62/945,844, filed on Dec. 9, 2019.

(51) Int. Cl.
*G06F 18/40* (2023.01)
*G06F 3/0482* (2013.01)
(Continued)

(52) U.S. Cl.
CPC ............ *G06F 18/41* (2023.01); *G06F 3/0482* (2013.01); *G06F 3/04847* (2013.01);
(Continued)

(58) Field of Classification Search
CPC .. G06F 18/41; G06F 18/2148; G06F 18/2178; G06F 3/0482; G06F 3/0487;
(Continued)

(56) References Cited

U.S. PATENT DOCUMENTS 9,355,359 B2    5/2016  Welinder
10,127,438 B1  11/2018  Fisher
(Continued)

FOREIGN PATENT DOCUMENTS

JP   2018207222   12/2018
JP   2019036167    3/2019
(Continued)

OTHER PUBLICATIONS

Clausner Christian et al: "Efficient and effective OCR engine training", International Journal on Document Analysis and Recognition, Springer, Heidelberg, DE, vol. 23, No. 1, Oct. 30, 2019, pp. 73-88, XP037028430, ISSN: 1433-2833, DOI: 10.1007/S10032-019-00347-8.

*Primary Examiner* — Shane D Woolwine
(74) *Attorney, Agent, or Firm* — Loginov & Associates, PLLC; William A. Loginov

(57) ABSTRACT

This invention overcomes disadvantages of the prior art by providing a vision system and method of use, and graphical user interface (GUI), which employs a camera assembly having an on-board processor of low to modest processing power. At least one vision system tool analyzes image data, and generates results therefrom, based upon a deep learning process. A training process provides training image data to a processor (optionally) remote from the on-board processor to cause generation of the vision system tool therefrom, and provides a stored version of the vision system tool for runtime operation on the on-board processor. The GUI allows manipulation of thresholds applicable to the vision system tool and refinement of training of the vision system tool by the training process.

20 Claims, 3 Drawing Sheets

(51) Int. Cl.
*G06F 3/04847* (2022.01)
*G06F 18/21* (2023.01)
*G06F 18/214* (2023.01)
*G06N 3/04* (2023.01)
*G06N 3/08* (2023.01)
*G06V 10/70* (2022.01)

(52) U.S. Cl.
CPC ...... *G06F 18/2148* (2023.01); *G06F 18/2178* (2023.01); *G06N 3/04* (2013.01); *G06N 3/08* (2013.01); *G06V 10/70* (2022.01)

(58) Field of Classification Search
CPC ........ G06V 10/70; G06N 20/00; G06N 20/10; G06N 20/20; G06N 3/02; G06N 3/04; G06N 3/0464; G06N 3/08
See application file for complete search history.

(56) References Cited

U.S. PATENT DOCUMENTS

| | | | |
|---|---|---|---|
| 10,133,933 B1 | 11/2018 | Fisher | |
| 10,417,524 B2 | 9/2019 | Feng | |
| 10,467,504 B1 | 11/2019 | Hamedi | |
| 10,713,540 B2 | 7/2020 | Zhang | |
| 10,719,301 B1 | 7/2020 | Dasgupta | |
| 11,232,687 B2 | 1/2022 | Fisher | |
| 11,250,376 B2 | 2/2022 | Fisher | |
| 11,514,337 B1 | 11/2022 | Karpman | |
| 11,605,176 B2 | 3/2023 | Singhal | |
| 11,915,499 B1 | 2/2024 | Kohler | |
| 11,960,984 B2 | 4/2024 | Salman | |
| 2015/0294191 A1* | 10/2015 | Zhang | G06T 7/0002 382/160 |
| 2015/0324451 A1 | 11/2015 | Cormack | |
| 2017/0252922 A1 | 9/2017 | Levine | |
| 2017/0334066 A1 | 11/2017 | Levine | |
| 2017/0372232 A1 | 12/2017 | Maughan | |
| 2018/0114334 A1 | 4/2018 | Desai | |
| 2018/0218755 A1* | 8/2018 | Kawaguchi | G06F 18/22 |
| 2018/0240031 A1 | 8/2018 | Huszar | |
| 2019/0122073 A1 | 4/2019 | Ozdemir | |
| 2019/0325259 A1 | 10/2019 | Murphy | |
| 2019/0378050 A1 | 12/2019 | Edkin | |
| 2020/0005069 A1 | 1/2020 | Wang | |
| 2020/0085382 A1 | 3/2020 | Taerum | |
| 2020/0103894 A1 | 4/2020 | Cella | |
| 2020/0120097 A1 | 4/2020 | Amitay | |
| 2020/0211692 A1 | 7/2020 | Kalafut | |
| 2020/0250583 A1 | 8/2020 | Hammond | |
| 2020/0327667 A1* | 10/2020 | Arbel | G06V 10/764 |
| 2020/0334416 A1 | 10/2020 | Vianu | |
| 2020/0380675 A1 | 12/2020 | Golden | |
| 2021/0090694 A1 | 3/2021 | Colley | |
| 2022/0189185 A1 | 6/2022 | Wyss | |
| 2022/0335256 A1 | 10/2022 | Saraee | |
| 2022/0379484 A1 | 12/2022 | Tremblay | |
| 2023/0078218 A1 | 3/2023 | Wang | |
| 2024/0135159 A1 | 4/2024 | Piazentin Ono | |
| 2024/0135160 A1 | 4/2024 | Piazentin Ono | |
| 2024/0144141 A1 | 5/2024 | Cella | |
| 2024/0177341 A1 | 5/2024 | Yamada | |
| 2024/0212377 A1 | 6/2024 | Mulla | |
| 2024/0220848 A1 | 7/2024 | Mahmud | |
| 2024/0355120 A1 | 10/2024 | Baker | |

FOREIGN PATENT DOCUMENTS

| | | |
|---|---|---|
| JP | 2020187072 | 11/2020 |
| WO | 2019032307 A1 | 2/2019 |

* cited by examiner

SYSTEM AND METHOD FOR APPLYING DEEP LEARNING TOOLS TO MACHINE VISION AND INTERFACE FOR THE SAME

RELATED APPLICATION

This application claims the benefit of U.S. Patent Application Ser. No. 62/945,844, entitled SYSTEM AND METHOD FOR APPLYING DEEP LEARNING TOOLS TO MACHINE VISION AND INTERFACE FOR THE SAME, filed Dec. 9, 2019, the teachings of which are expressly incorporated herein by reference.

FIELD OF THE INVENTION

This invention relates to systems and methods for performing machine vision tasks using deep learning processes and interfaces for training and operating such systems and methods.

BACKGROUND OF THE INVENTION

Machine vision systems (also termed herein "vision systems") that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or remote, interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. Various examples of vision system applications include inspection of objects/parts for defects and/or tolerances, classification of parts (e.g. type of part, version, model, etc.), part location within an imaged scene, and/or optical character recognition (OCR). These applications can be applied to a number of industrial tasks including, but not limited to, control various processes—for example moving a robot manipulator/motion stage or gating objects on a moving (e.g. conveyor) line, such as defective part rejection.

It is desirable to apply advanced processes, such as those available using deep learning (e.g. a neural network or other "AI" based systems) computing architectures. Associated with these architectures, are various training procedures and interfaces that can facilitate use.

SUMMARY OF THE INVENTION

This invention overcomes disadvantages of the prior art by providing a vision system and associated method of use, and graphical user interface (GUI), which employs a camera assembly having an on-board processor of low to modest processing power. At least one vision system tool analyzes image data, and generates results therefrom, based upon a deep learning process. A training process provides training image data to a processor (optionally) remote from the on-board processor to cause generation of the vision system tool therefrom, and provides a stored version of the vision system tool for runtime operation on the on-board processor. The GUI allows manipulation of thresholds applicable to the vision system tool and refinement of training of the vision system tool by the training process.

In an exemplary embodiment, a vision system for use with a camera assembly is provided, which can comprise a graphical user interface (GUI) having a candidate box that automatically provides one or more candidate training images used to incrementally train one or more deep learning tools and generate results therefrom. The candidate training images can comprise stored images and images acquired by the camera assembly during runtime operation. Illustratively, the candidate training images can be proposed automatically based upon statistical analysis or measurements of image properties. The GUI can be constructed and arranged for manipulation by a non-expert user based upon visual feedback as the user applies inputs to the GUI. The GUI can have dialog boxes arranged to allow entry of an angle of an imaged object. The GUI can have a candidate box that displays the proposed new candidate training images based upon statistical analysis and measurements of image properties. The one or more candidate training images can be used to incrementally train one or more deep learning tools after being selected by a user operating the GUI. The new candidate training images can be divided based upon a pass/fail inspection criteria using a CNN or deep learning process, and/or the new candidate training images can divided based upon an overall classification of an imaged object or locations or identities of individual features of the imaged object. An automatic training process can be provided, which is adapted to incrementally train itself using the new candidate training images to improve performance over time, or as new use cases are identified. The camera assembly can include an on-board processor, and the one or more deep learning tool(s) can be trained on a processor remote from the on-board processor for loading on the on-board processor. Illustratively, the GUI can be constructed and arranged to allow the user to manipulate thresholds applicable to the one or more deep learning tools and apply refinements to the one or more deep learning tool(s) previously loaded on-board processor. The refinements can be applied to the system using the GUI based upon the visual feedback. The one or more deep learning tools can be based upon a neural network. The graphical representation can comprise at least one of (a) types of non-conforming images, (b) classes of objects in images and (c) locations of non-conforming features on objects. Illustratively, the GUI can define a plurality of stepwise function selections that allow the user to select at least camera setup, training and runtime operation. The GUI can include thumbnail images that define the conforming and non-conforming image based upon the threshold.

A system and method for operating a vision system having a camera assembly and a processor that applies vision system processes image data can be provided. According to the system and method, one or more candidate training images can be selected automatically from a runtime image set. The one or more candidate training images can be provided in a candidate box of a graphical user interface (GUI). The system and method can enable selection, by a user of the GUI, of one or more candidate training images as at least one passing image or at least one failing image, and can perform a further training process based upon one or more deep learning tool(s) using the selected at least one passing image. A stored version of the one or more deep learning tool(s) can then be provided for runtime operation. Illustratively, the candidate training images can be provided automatically using statistical analysis or measurements of properties of the one or more candidate training images. The GUI can be operated to manipulate thresholds applicable to the one or more deep learning tools and to apply refinements to the one or more deep learning tool(s) previously loaded on-board processor. The GUI can be employed by the user, to provide a plurality of stepwise function selections that allow selection of at least camera setup, training and runtime operation.

BRIEF DESCRIPTION OF THE DRAWINGS

The invention description below refers to the accompanying drawings, of which.

DETAILED DESCRIPTION

Figure 1:
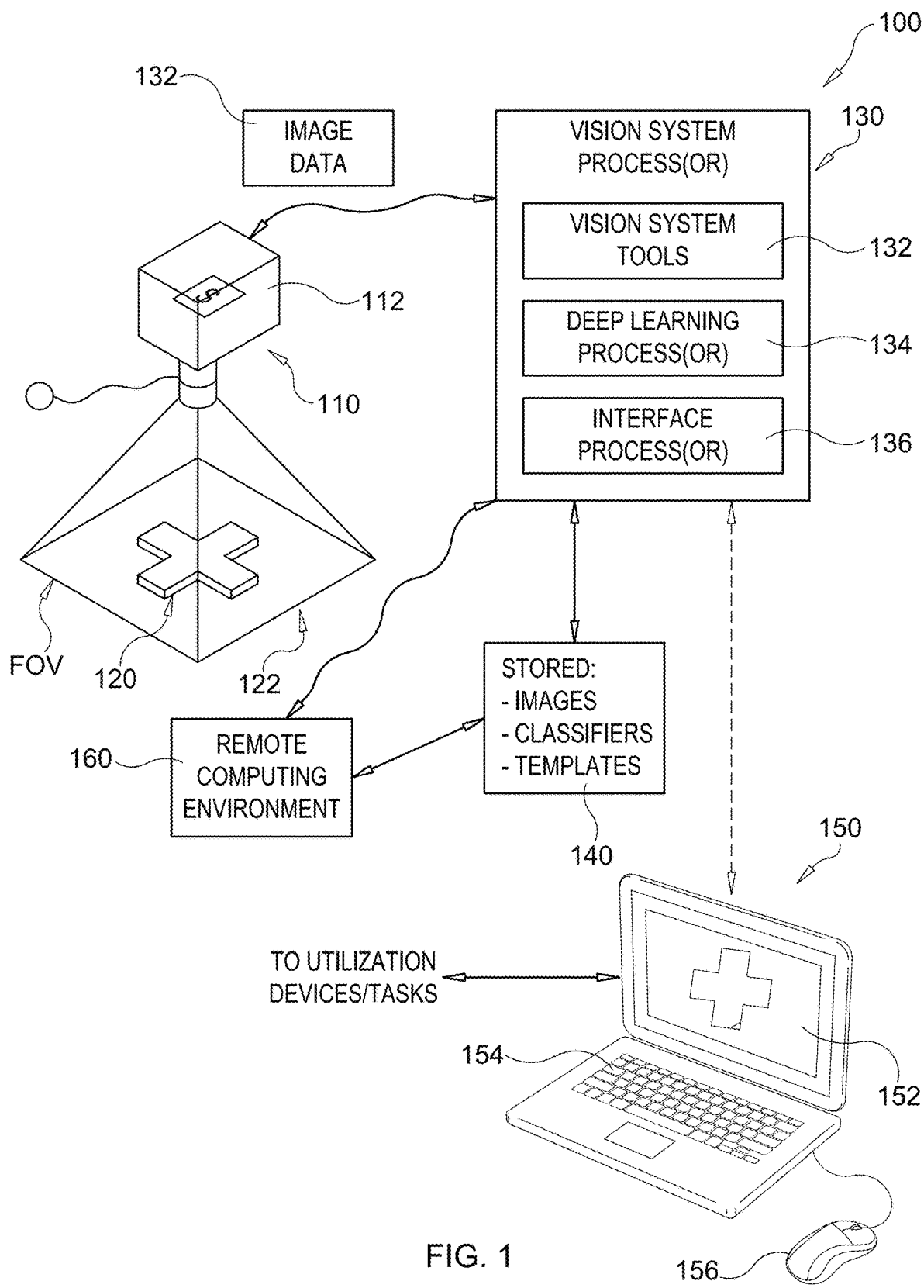
FIG. 1 is a diagram of a vision system arranged to analyze an imaged object using a vision system tool based upon deep learning computing processes and an associated graphical user interface (GUI) to train the and control runtime analysis of the acquired image data.

FIG. 1 shows an overview of a vison system arrangement 100 that incorporates a deep learning processing/processor architecture according to an exemplary embodiment. The arrangement 100 includes one or more vision system camera (s) 110, having an associated housing/enclosure 112 that supports an optics package O and an aligned image sensor S of any acceptable type and resolution. The camera 110 is shown acquiring images of a training or runtime object 120, within the camera's field of view (FOV) in an overall imaged scene 122. A processor 130 receives the image data 132 acquired by the sensor (or made available from a storage source 140) and performs desired training and/or runtime analysis operations thereon. The processor 130 (which can define any acceptable architecture—e.g. microprocessor, FPGA, ASIC, etc.) can be partially or entirely contained within the enclosure 112 so that the camera 110 defines a so-called "smart camera" assembly. For example, elements of the processor's functions in a remote computing device 150 and/or 160, interconnected by a wired or wireless link. The computing device can be a server, PC, laptop, tablet, smartphone, cloud computing environment, or combination thereof. Multiple computing devices can also be provided for performing different functions—for example, a cloud or server 160 to implement training and/or other processes, and the depicted computer 150 (e.g. a laptop) to perform local user interface functions. The interface computer can include conventional or custom features, such as a display and/or touchscreen 152, keyboard 154, mouse/touchpad 156, etc. Some of the interface functions can also (or alternatively) be provided directly on the enclosure 112 in the form of touchscreens, buttons, indicators, speakers, etc.

The vision system process (or) 130 includes a plurality of functional processes/ors or modules, which can be widely variable. In general, the processes/ors can include various conventional or custom vision system tools 132—those used in desired applications, including, but not limited to inspection, classification, part location and OCR (described above). The vision system process (or) 130 further includes deep learning processes/ors 134 that run or enhance these tools 132. A variety of hardware platforms can be employed to support deep learning. These can include, but are not limited to, graphical processing units (GPUs), inference hardware (sourced from (e.g.) Movidius of San Mateo, CA), and other platforms—for example SIMD processors, etc. The deep learning process (or) can be provided based upon any acceptable commercially available or custom software package(s), and associated, compatible, hardware platforms. One acceptable form of deep learning is instantiated using a convolutional neural network architecture (CNN). Commercially available CNN packages can be sourced from various vendors, such as TensorFlow, Microsoft CNTK, etc. The operation and manipulation of the deep learning process (or) is describe below. The vision system process (or) also includes an interface process (or)/module 136 that drives various training and runtime GUI functions and displays. Operation of the interface process (or), and its associated display(s) is/are described further below.

As described above, both training and runtime deep learning operations can employ stored data 140, which can be retained on the camera and/or a local computing device or on a remote server/cloud computing environment. The stored data can include images, classifiers and templates, as well as other information relevant to operation of the deep learning process (or) 134.

Figure 2:
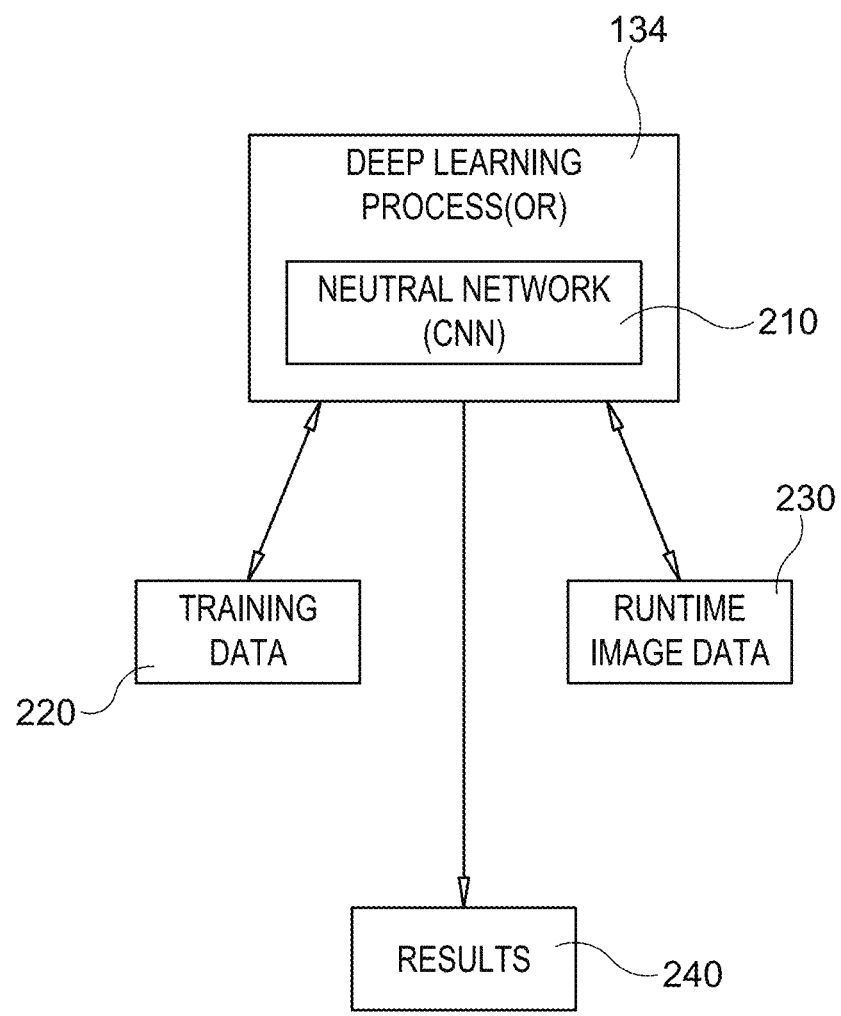
FIG. 2 is a block diagram showing a generalized deep learning-based vision system tool for use with the vision system of FIG. 1.

With reference to FIG. 2, the deep learning process (or) 134 is shown, schematically in further detail. The process (or) 134, by way of non-limiting example, consists of a convolutional neural network (CNN) 210, according to an exemplary embodiment. Operation of such a CNN is further described in commonly assigned U.S. patent application Ser. No. 16/433,602, entitled SYSTEM AND METHOD FOR FINDING AND CLASSIFYING PATTERNS IN AN IMAGE WITH A VISION SYSTEM, filed Jun. 6, 2019, the teachings of which are incorporated by reference as useful background information.

The depicted CNN 210 is constructed based upon training data, 220, which can be derived from libraries of image features and/or from a series of acquired images of various objects and conditions—for example those having certain orientations, lighting effects, defects, etc. The CNN 210, in runtime, receives image data 230 from runtime objects and applies the constructed CNN to derive appropriate results 240, which are displayed to the user on the GUI, described further below.

Figure 3:
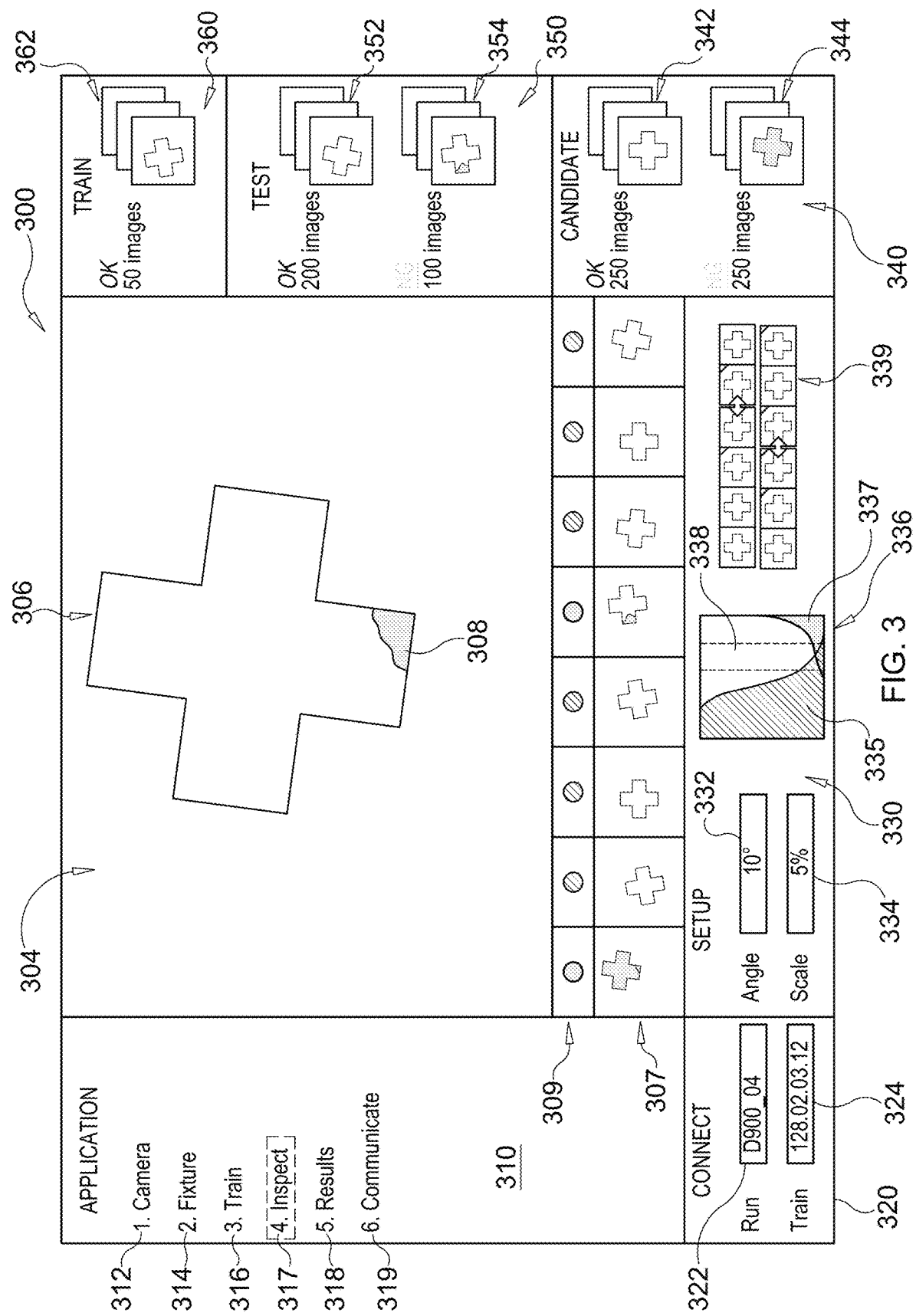
FIG. 3 is a diagram of an exemplary screen display showing a graphical user interface (GUI) according to an exemplary embodiment.

FIG. 3 depicts an exemplary display screen 300 in relation to the GUI of the exemplary embodiment. In this depiction, runtime inspection is shown. Broadly stated, the GUI defines a platform for deep learning machine vision applications aimed at the manufacturing and logistics markets. It adds deep learning processes to a guided visual application development environment. In this manner, a more-accurate and robust vision system is provided herein.

The interface screen 300 contains a plurality of windows and dialog boxes, which can be varied widely in content and/or placement in alternate arrangements herein. The (e.g.) top center window 304 shows a current image (and/or graphical representation) of an exemplary training or runtime object 306 in an images scene. As described below, this image can contain a defect or other notable feature 308 that is highlighted as shown. Below this main viewing window 304 is a filmstrip showing a row of thumbnails 307 (e.g. eight thumbnails), each comprising individual images. The images are accompanies by overlying, associated indicia 308 that are color coded (e.g. green or red) to depict whether the image represents a conforming or non-conforming pattern. In the depiction, the exemplary green color (indicative of conforming features), is represented as cross hatching, while the exemplary red color (indicative of non-conforming features) is depicted as gray. A wide range of colors or other (monochromatic/multicolor) patterns can be employed in the GUI to convey different types or levels of information.

The (e.g.) rightmost depicted box 310 defines the stages 312-319 of a guided application development framework, in which the deep learning process (or) can be implemented. For example, the stages can include camera setup 312, fixturing 314, training, using the deep learning network (CNN) 316, runtime object inspection 317 using deep learning, providing and handling of inspection results 318 and communication setup 319 between the camera and various elements of the system.

The connection box 320 allows the user the option to connect the camera processor to a network PC or Cloud for CNN training. It includes dialog boxes for various addresses (MAC, IP, etc.) for use at runtime 322 and/or training time 324. In this manner, the system can be trained initially on a high-powered PC or cloud computing station to accommodate the large-volume processing demanded by a robust CNN. Once initially trained, the system allows incremental improvements to be performed on a lower-powered inference engine or the internally enclosed processor of a smart camera, using incremental learning techniques. These allow the system to adapt to changes over time, or to be rapidly deployed on other production lines with slightly different lighting, cameras, or product variations.

Stated differently, the processor arrangement and communications interface functions are arranged so that the processor located on the camera (i.e. a smart camera assembly) 110, can be reduced in processing power relative to the full requirements for efficiently training a CNN. The construction of the trained CNN (or other deep learning tool) can occur on a more-powerful remote processor (such as a server or cloud computer (160 in FIG. 1)). The trained CNN can then be loaded from the remote computer into the camera's local, on-board, processor 130 for runtime operation. Incremental improvements/updates can be loaded from the remote computer as needed, or processed internally using the lower-power on-board processor.

The interface box 330 relates to setup and configuration of the deep learning-based vision tools. In general, this box allows the user to define the acceptance threshold for images. Notably, such deep learning tools can be configured graphically herein using the exemplary GUI screen 300, with a minimum of explicit parameters. Most internal parameters are estimated intelligently by the underlying CNN and GUI process (or), based on the images and feedback provided by the user. By way of example, dialog boxes are provided to enter object angle 332. A graphical representation 336 is shown, which, in this example, defines the distribution of conforming or "good" (OK) image examples 335 versus non-conforming (defective) or "not good" (NG) image examples. There is an overlap region 338 between the OK and NG images as shown. A filmstrip 339 shows the stream of thumbnail images being trained or analyzed and provides a way to access a view of each in the main window 304. This thumbnail stream 339 allows the user to directly observe the acceptance/scoring threshold that has been set by the user (e.g. using color codes for NG, OK and overlap), and highlights regions of interest on the thumbnail. Images can be scored based upon the threshold setting. The curves 336, 337 allow for graphical feedback on thresholds for the user.

A candidate box 340 is provided in the screen 300. New candidate images for the training and testing sets are proposed automatically using statistical analysis and measurements of image properties. These images are pulled from the runtime image set and can form the basis of further training/refinement by expanding the training set or the test set (below). As shown in this example, the candidates are divided into OK and NG categories as shown 342, 344 by the processor, based upon the trained CNN/deep learning process. The depicted basic pass fail type of inspection is one possible implementation of the system and method herein. Alternatively (or additionally), some further categories can include overall classification of an object or the locations and/or identities of individual object features, among other possible tasks. As described elsewhere herein, the system is adapted to incrementally train itself using these images 342, 344 so as to improve performance over time, or as new use cases (new orientations, lighting, defects, etc.) are identified by the user or via automated mechanisms.

Sets of images are managed by a training box 360 and testing box 350. The training box 360 contains a set 362 of good/OK images that define the desired features for the object. Testing box 350 includes depicted sets of OK and NG images 352, 354. More generally, the system uses deep learning to suggest image classification into such good/bad (OK/NG), or other, categories. During training and testing, the user merely confirms graphically that the classification is correct, and adjusts it if not by categorizing the image's particular class via the interface. Alternatively, or additionally, such adjustment can also include the addition or repositioning of an imaged object feature and/or the highlighting of an image area through (e.g.) pixelwise drawing tools. By way of a non-limiting adjustment example, if the user visually observes a defective image classified as OK, he/she can click and re-categorize it as NG. Conversely, a slightly defective, or otherwise good, image may not meet the threshold to be rejected, and can be classified as OK. This is used by the CNN to reorient the decision-making process as appropriate.

It should be clear that the above-described interface screen is arranged with minimal numerical and/or textual input required of the user. The training and runtime operations can be largely manipulated by visual observation, reviewing and classifying images as appropriate to the project. To the extent more-detailed information is required by the system, it can be generated automatically using various factory preset, thresholds (or those set up by an installer/skilled operator) and/or pre-existing algorithms.

The interface screen 300 can also provide pre-trained tools. These tools can be adapted to recognize common use cases/examples of images (for example, hexagonal bolt outlines, etc.) or can be custom trained (by (e.g.) a skilled operator or the factory) to identify specific features related to the user—for example, user-specific weld features, specialized threads, etc. The interface can allow the user to, essentially fine-tune the training to provide a completed CNN/deep learning tool. This fine tuning can be performed on the camera's local processor 130 so that processing power can remain low compared with fully featured computing environments (e.g. servers and cloud computing).

Another feature facilitated by the system, herein is the ability to store images locally within (or associated with) the on-board processor 130, and perform an initial categorization (e.g. OK/NG) concurrent with the time of acquisition by the camera. Such images can be subsequently presented to the user for review using the interface 300 and then loaded on the remote computing environment for training (or refinement) of the CNN. The categorizing of acquired images prior to review by the user simplifies his/her task and requires only correcting those that are potentially miscategorized (i.e. those in the overlap region 338). Additionally, the system and method can be arranged so that image features are divided into separate types or categories of defects in addition to a basic OK/NG—for example surface defects, missing pieces, etc. As described more generally above, various classifiers can also be defined within the deep learning environment to categorize images into different types or classes that can reveal what the object is—for example Part A or Part B, 2-inch bolt or 3-inch bolt, left door handle or right door handle, full or empty, etc. Moreover, the image data can be broken down as to where on an object the defect resides. These additional defects, classes and/or locations can be presented as additional sets on the GUI in addition to (or as an alternative to) OK and NG, as shown.

It should be clear that the system and method described herein advantageously allows a (e.g.) smart camera of low or modest computing power to operate one or more a robustly trained deep learning vision system tool(s) by handling initial training remote from the camera's on-board processor, and providing the user with an a GUI that simplifies training and refinement with visually based programming of the system. Trained deep learning tools then are run on the camera processor, and refined as needed thereby (e.g. as new use cases arise), using the GUI. Overall, the system and method effectively leverages reduced camera processing power and simplifies setup and handling for the user. Additionally, the system and method herein generally provides a highly user-friendly interface environment (leveraged by deep learning tools which provide visual feedback) that allows for ease of training, testing and runtime operation by users that have minimal skill or expertise. Such users can be characterized as "non-expert" users as defined herein—that is, those who have not received extensive and/or specialized training in the setup and/or operation of a machine vision system.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A vision system for use with a camera assembly comprising:
    at least one processor associated with the camera assembly and configured to:
        receive runtime images of objects acquired by the camera assembly during a runtime operation, at least a portion of the runtime images being processed during the runtime operation with a learning-based machine vision tool;
        identify a candidate image including an object from the runtime images;
        provide a suggested categorization of the objects based on the candidate image, the categorization corresponding to one or more of: types of non-conforming images, classes of objects in images, or locations of object features; and
        based on the suggested categorization;
        update a learning model of the learning-based machine vision tool by configuring a new category or refining categorization for the one or more of: types of non-conforming images, classes of objects in images, or locations of object features; and
        update the vision system so that a future runtime image acquired by the camera assembly is processed with the learning-based machine vision tool based on the updated learning model; and
    a graphical user interface (GUI) in communication with the at least one processor and configured to display a candidate box that provides the candidate image and to display the suggested categorization used to update the learning model of the learning-based machine vision tool.

2. The system of claim 1, wherein the candidate image is suggested based upon a statistical analysis or a measurement of an image property.

3. The system of claim 2, wherein the GUI is constructed and arranged for manipulation by a user based upon visual feedback as the user applies inputs to the GUI.

4. The system of claim 3, wherein the GUI has a dialog boxes arranged for entry of an angle of the object.

5. The system of claim 3, wherein the candidate box is configured to displays the candidate image based upon the statistical analysis or the measurements of the image property.

6. The system of claim 5, wherein the at least one processor is configured to incrementally train the learning model in response to receiving a user selection via the GUI.

7. The system of claim 5, wherein the candidate image is selected based upon a pass/fail inspection criteria using a Convolutional Neural Network (CNN) or a deep learning process.

8. The system of claim 5, wherein the candidate image is selected based upon an overall classification of the object, or a location, or an identity of an individual feature of the object.

9. The system of claim 5, further comprising, an automatic training process that is adapted to incrementally train itself using the candidate image to improve performance over time, or as a new use case is identified.

10. The system of claim 1, wherein the at least one processor includes:
an on-board processor within the camera assembly; and
a remote processor in communication with the on-board processor,
wherein the remote processor is configured to train the learning model associated with the learning-based machine vision tool.

11. The system of claim 10, wherein the GUI is constructed and arranged to receive a user input manipulating a threshold applicable to the learning model and apply a refinement to the learning model previously loaded on the on-board processor.

12. The system of claim 1, wherein the update of the vision system facilitates deployment of the vision system to environments that include different lighting, different cameras, or variations of features the object.

13. The system of claim 12, wherein a graphical representation of the object in the GUI comprises at least one of (a) types of non-conforming images, (b) classes of objects in images, or (c) locations of non-conforming features on objects.

14. The system of claim 13, wherein the GUI defines a plurality of stepwise function selections corresponding to at least camera setup, training, and runtime operation.

15. The system of claim 13, wherein the GUI includes a thumbnail image that defines the object based upon a threshold.

16. A method for operating a vision system having a camera assembly associated with at least one processor that applies vision system processes to image data, comprising the steps of:
receiving runtime images of objects acquired by the camera assembly during a runtime operation, at least a portion of the runtime images being processed during the runtime operation with a learning-based machine vision tool;
identifying a candidate image including an object from the runtime images;
suggesting a categorization of the object based on the candidate training-image for one or more of: non-conforming images, classes of objects in images, or locations of object features;
providing the candidate image in a candidate box of a graphical user interface (GUI);
providing the categorization in the GUI;
receiving a user selection of a displayed item in the GUI;
based on the user selection and of the categorization, performing an update to a learning model of the learning-based machine vision tool, wherein the update includes configuring a new category or refining a categorization for the one or more of: types of non-conforming images, classes of objects in images, or locations of object features; and
providing a stored version of the updated learning model for access by the at least one processor when applying the learning-based machine vision tool during runtime operation.

17. The method of claim 16, further comprising, proposing the candidate images using statistical analysis or a measurement of a property of the candidate image.

18. The method of claim 16, further comprising, in response to receiving a user input, manipulating a threshold applicable to the learning model and applying a refinement to the learning model.

19. The method of claim 16, further comprising, enabling operation of a plurality of stepwise function selections that enable selection via the GUI of at least camera setup, training, and runtime operation.

20. A vision system, comprising:
a camera assembly defining a field of view (FOV) and configured to capture runtime images of an object disposed within the FOV during a runtime operation of the vision system;
a learning-based machine vision tool configured to conduct at least one of inspection, classification, part location, or optical character recognition (OCR);
a graphical user interface (GUI) configured to display aspects of the learning-based machine vision tool; and
one or more processors, associated with the GUI and the camera assembly, that apply the learning-based machine vision tool to the runtime images during the runtime operation, the one or more processors adapted to:
select a candidate image including the object from the runtime images,
display the candidate image via the GUI;
based on a user selection in the GUI, update a learning model for the learning-based machine vision tool, wherein the update includes configuring a new category or refining a categorization relative to one or more of: types of non-conforming images, classes of objects in images, or locations of object features; and
providing the updated learning model for access by the one or more processors when applying the learning-based machine vision tool during runtime operation.

* * * * *